(12) United States Patent
Sackinger et al.

(10) Patent No.: US 6,202,734 B1
(45) Date of Patent: Mar. 20, 2001

(54) APPARATUS FOR JET APPLICATION OF MOLTEN METAL DROPLETS FOR MANUFACTURE OF METAL PARTS

(75) Inventors: Philip A. Sackinger, Cedar Crest; Marcelino Essien, Albuquerque; Henry C. Peebles, Albuquerque; Eric M. Schlienger, Albuquerque, all of NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/128,346

(22) Filed: Aug. 3, 1998

(51) Int. Cl.[7] .................................................. B22D 23/00
(52) U.S. Cl. ............................................ 164/271; 164/46
(58) Field of Search .................................. 164/271, 258, 164/46; 266/202; 118/623

(56) References Cited

U.S. PATENT DOCUMENTS 5,171,360 * 12/1992 Orme et al. .............................. 164/46
5,176,874 * 1/1993 Mourer et al. .................... 164/271 X
5,669,433 * 9/1997 Sterett et al. ........................... 164/46

\* cited by examiner

Primary Examiner—J. Reed Batten, Jr.
(74) Attorney, Agent, or Firm—Brian W. Dodson

(57) ABSTRACT

The apparatus comprises a device for supplying molten metal, a device for heating molten metal such that it remains fluid while within the apparatus, a device for applying a magnetic field in a direction perpendicular to the device for supplying molten metal, a device for transmitting electric current directly through molten metal to exert a force in a first direction on molten metal, where the device for transmitting can reverse the direction of the current to a second direction, opposite of the first direction, to form a droplet of molten metal, and a receiver for the droplet where the accumulation of a multitude of droplets upon the receiver results in the formation of the desired metal part. The mixing chamber can include a rotary electrode arrangement which mixes the molten metal by movement. In order to customize the metal composition of various areas of the metal part being produced, the apparatus can have a first and second feed stream input, each feed stream being of a different composition, and each input with port electrodes, where the supply of electric current to the port electrodes is separably controlled, such that variation in the amount of current supplied to each port electrode results in variation in the amount of molten metal that is moved through the first and second input into the annular chamber.

11 Claims, 7 Drawing Sheets

APPARATUS FOR JET APPLICATION OF MOLTEN METAL DROPLETS FOR MANUFACTURE OF METAL PARTS

FIELD OF THE INVENTION

This invention relates to molten metal jetting and the application of magnetohydrodynamic (MHD) drive chamber technology as part of an overall system to deliver high temperature molten metal droplets, or a mixture of metals, for the direct formation of metal parts.

BACKGROUND OF THE INVENTION

The MHD jetting device of the present invention accomplishes the direct fabrication of metal parts by forming the desired part through the precise application of metal droplets upon a thermal sink. This device and method of use are suitable for rapid prototyping, free-form fabrication, and low volume manufacture of metal parts. Direct manufacture in metal using on-demand droplet deposition, as presently described, contrasts with direct manufacture processes of the prior art such as stereolithography (SLA), selective laser sintering (SLS), and three dimensional printing (3DP). SLA involves the use of photocurable resins and a laser to produce parts by sequentially building cross-section layers. The shape of the layers is directed by a computer by controlling exposure of the resin to the laser. This general process is described in U.S. Pat. No. 4,929,402 to Hull. SLS involves the use of powder layers, which are sintered by laser to produce three-dimensional parts. This process is described by Deckard in U.S. Pat. No. 4,863,538. 3DP is used to create a solid object by ink-jet printing a binder into selected areas of sequentially deposited layers of powder. Any unbound powder remains to support unconnected portions of the component as the layers are created and joined, and is removed after completion of the printing. 3DP is described in U.S. Pat. No. 5,204,055 issued to Sachs. Sanders Modelmaker (MM) and the IBM Genisys (marketed by Stratasys) are variants of the 3DP process, and exhibit the same limitations, as discussed more fully below.

The above-described processes and commercial embodiments are well adapted for use with plastic materials, such as polymers, but have significant drawbacks when done using metal. First, because the processes involve the use of powdered starting product, there is a need to manufacture, store and handle metal powders. This can be a particularly nettlesome process, fraught with safety concerns and with a need to protect reactive metals from the atmosphere. Second, the need for consolidation of the manufactured layers often requires the part to be subjected to high temperatures that may cause undesirable phase transitions in the metal. As described below, this problem is avoided by other manufacturing processes, such as ballistic particle manufacturing (BPM), which used cold welding of the particles on impact. Finally, there is no convenient means for arbitrarily adjusting the composition of the part in different locations. It is difficult to deposit the correct proportion of powder in the right place and to keep it there without disturbance until the part is consolidated. For these reasons, the present invention offers significant advantages over these direct manufacturing processes of the prior art.

Two other direct manufacturing processes of the prior art are ballistic particle manufacturing (BPM) and fusion deposition modeling (FDM). BPM utilizes an ink-jet apparatus to "print" successive cross-sections of the object to be formed. The layers are bonded using either cold welding or a rapid solidification technique. A corporation in Greenville, S.C.—BPM, Inc.—manufactures commercial BPM systems. Automated Dynamic Corp. of Troy, Mich., manufactures apparatus utilizing BPM with metals or metal composites. FDM involves the continuous extrusion of thermoplastics from an inkjet-like printhead. It has not been adapted for metals and lacks the control of on-demand ejection of individual metal droplets of desired composition, as presently disclosed. A FDM system is available from Stratasys, Inc. of Minneapolis, Minn. The present invention is advantageous when compared to these processes because it uses metal, relies on the natural bonding of molten droplets to the solid part being built, and can be easily adapted for production of arbitrary variations in composition, as described in detail below.

The present invention's drop-on-demand approach represents a considerable improvement over the continuous stream metal jetting devices of the prior art. These prior art devices broke a continuous stream of solder into uniform droplets using a piezoelectric crystal. Such a system is described by Hayes et al. in "Picoliter Solder Droplet Dispensing" *Proceedings of the International Symposium on Microelectronics,* ISHM '92 (October 1992) and Hayes and Wallace, "Solder Jet Printing for Low Cost Wafer Bumping," *Proceedings of the International Symposium on Microelectronics,* ISHM '96 (October 1996). After leaving the nozzle, each solder droplet passes through a charging electrode system where it acquires a uniform charge. The charged droplets can then be steered to specific positions on the target substrate using electrostatic plates. Devices of this type have been demonstrated that emit solder droplets as small as 25 $\mu$m in diameter. However, droplet emission from a continuous stream jetting device cannot be rapidly turned on and off. Consequently, droplet deposition on the substrate must be interrupted by diverting the solder stream into a catch reservoir, resulting in significant waste. Furthermore, piezoelectric crystals suffer depolarization at elevated temperatures resulting in decreased performance. To date, piezoelectric crystals have not been used in jetting devices operating at temperatures above those require for molten eutectic SnPb solder (around 200° C.).

Therefore, there is a need in the art for a liquid metal jetting technique which provides the deposition of nanoliter size droplets of molten metal with high positional accuracy using methods analogous to those developed by the inkjet printing industry. The use of a MHD drive makes it unique in its ability to translate electrical signals directly into tailored pressure pulses to dispense high temperature metal droplets. These electrical signals are derived from computer-aided design (CAD) data, resulting in precise repeatable droplet deposition with high flexibility. However, the formation of single uniform molten metal droplets from a jetting orifice is a complex process dependent on many factors including the shape and size of the jetting orifice, the surface tension and viscosity of the metal, the wetting interaction between the metal and the orifice material, and the configuration and timing of the electrical signal/pressure pulse applied to the molten metal. The present invention describes a metal jetting device and a method of use of that device which has maximized the variables listed above for the direct formation of metal parts.

SUMMARY OF THE INVENTION

The present invention is an apparatus and a method of use for that apparatus to accomplish the direct formation of metal parts from molten metal. The apparatus comprises a means for supplying molten metal, a means for heating molten metal such that it remains fluid while within said apparatus, a means for applying a magnetic field in a direction perpendicular to said means for supplying molten metal, a means for transmitting electric current directly through molten metal to exert a force in a first direction on molten metal, where the means for transmitting can reverse the direction of the current to a second direction, opposite of said first direction, to form a droplet of molten metal, and a receiving means for the droplet where the accumulation of a multitude of droplets upon the receiving means results in the formation of the desired metal part. The means for supplying can be a mixing chamber comprising at least two feed stream inputs having port electrodes, where the inputs are oriented normal to the applied magnetic field, an optional disposal reservoir, a rotary electrode arrangement within the annular chamber of the mixing chamber, and a feed stream output having port electrodes, where the output is oriented normal to the applied magnetic field. The rotary electrode arrangement of the mixing chamber can comprise two sets of electrodes having opposite polarity, where each set comprises at least one electrode, where one set of electrodes is attached to the interior wall of the annular chamber and the other set of electrodes is attached to the outer wall of the annular chamber, where the passing of current through said two sets of electrodes causes molten metal present in said annular chamber to move, thus mixing said metal. In order to customize the metal composition of various areas of the metal part being produced, the apparatus can have a first and second feed stream input, each feed stream being of a different composition, and each input with port electrodes, where the supply of electric current to said port electrodes is separably controlled, such that variation in the amount of current supplied to each port electrode results in variation in the amount of molten metal that is moved through said first and second input into the annular chamber.

This apparatus is used to produce metal models through the precise positional deposit of a small diameter droplet of a molten metal or a mix of molten metals by a jetting means upon a receiving means, a movement of the receiving means or the jetting means or both such that the subsequent droplet produced by the jetting means will be deposited in the desired position, and repetition of positioning and movement processes until the sum of the deposited droplets forms the desired metal part.

DESCRIPTION OF THE PREFERRED EMBODIMENT

Figure 1:
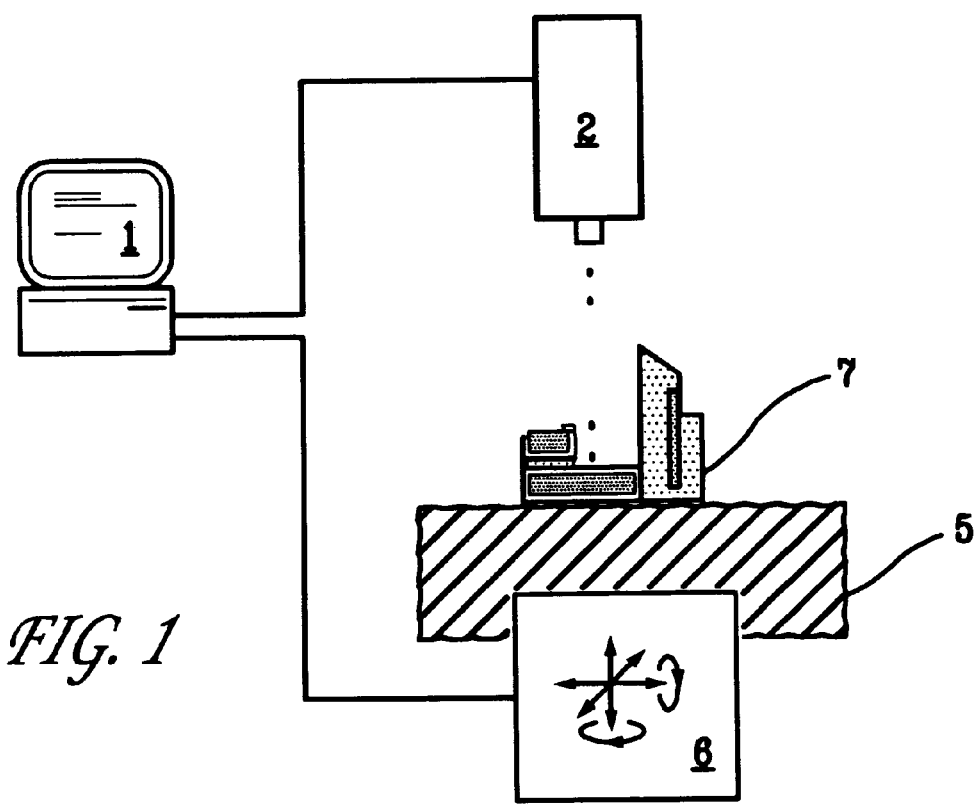
FIG. 1 is a schematic diagram of the device of the present invention.

The present invention comprises the following basic components, as illustrated in FIG. 1: a computer 1; a liquid metal jetting device (LMJD) 2, a thermal sink 5; a multi-axial movable stage 6; and the metal part 7 to be formed.

The computer 1 is used to translate the electronic CAD format of the desired part into a sequence of signals that control the mixing of the individual metal feedstock components, the emission of droplets, the positioning of the movable stage, and optionally, the aiming and positioning of the liquid metal jetting device. The liquid metal jetting device does not necessarily need to be moved in order to create a part—the multi-axial movable stage 6 provides sufficient maneuverability for most purposes, but for large parts it may be more efficient to move the LMJD 2 instead of the part 7. The computer 1 does not need to provide low level functionality to the moveable stage 6 and to the jetting device 2, rather controllers can drive the actual devices, such as the current pulse generator 11 and the digitally controlled moveable stage 6.

Figure 2:
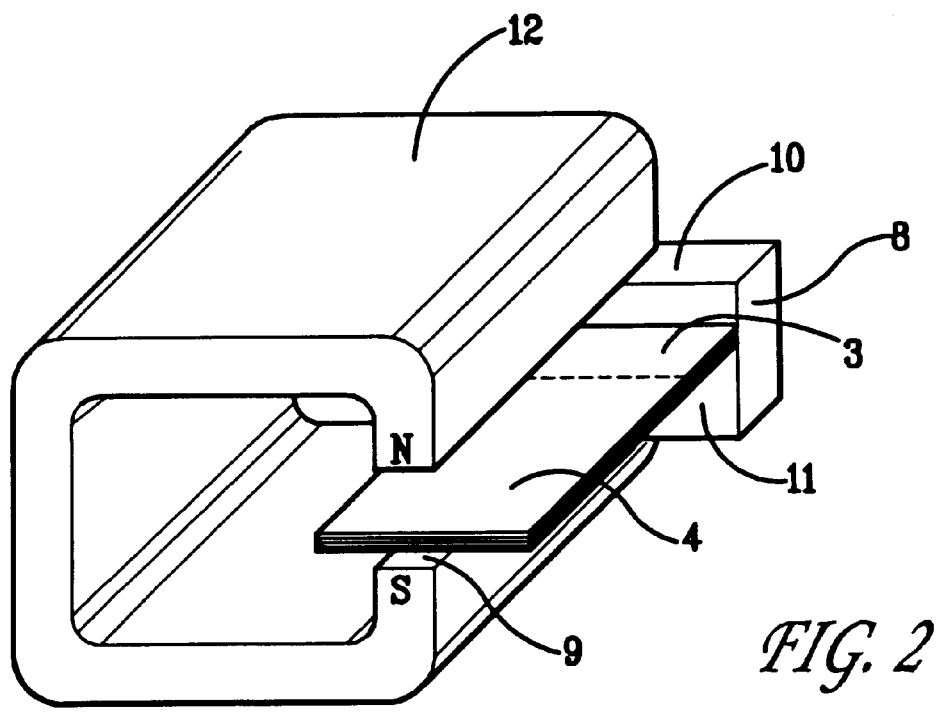
FIG. 2 is a schematic diagram of the liquid metal jetting device (LMJD) of the present invention.

The LMJD 2 is comprised of several parts as detailed in FIG. 2. The jetter can include heated reservoirs 8 lined with an inert material which store the molten metal, a molten metal mixing chamber 3, a drive chamber 4 with an orifice 9 at the exit, a heater 10 to insure the metal stays in a molten state until it is ejected from the orifice 9, an electric current pulse generator 11, and a magnet 12. The current pulse generator 11 and the magnet 12 are used for the mixing chamber and the drive chamber, both of which pump liquid metal based on the principles of magnetohydrodynamics. Details of these principles are contained in the disclosure of U.S. Pat. No. 5,377,961 to Smith et al. and below. Both the mixing chamber 3 and the drive chamber 4 comprise layers of materials that serve as electric insulators and resist erosion by high temperature molten metal. Example 1 below describes the method of selecting such inert material. Specifically, the outermost layer of mixing chamber 3 and the drive chamber 4 is a thermal insulator 35, designed to reduce heat loss from the molten metal as it travels through the chambers. The next layer is a housing 33 made of a strong material which retains its strength at high temperature and is a good heat conductor. The next layer is an electrical insulator 34 which is inert and also retains its strength at high temperature. The chambers also include metal leads 24, 30 that conduct electric current to various electrodes 25, 26, 29. The leads are electrical conductors capable of withstanding the elevated temperatures of the molten metal that is pumped through the rectangular ducts or channels 13, 28 formed by the void regions of the mixer 3 and the driver 4.

Figure 5:
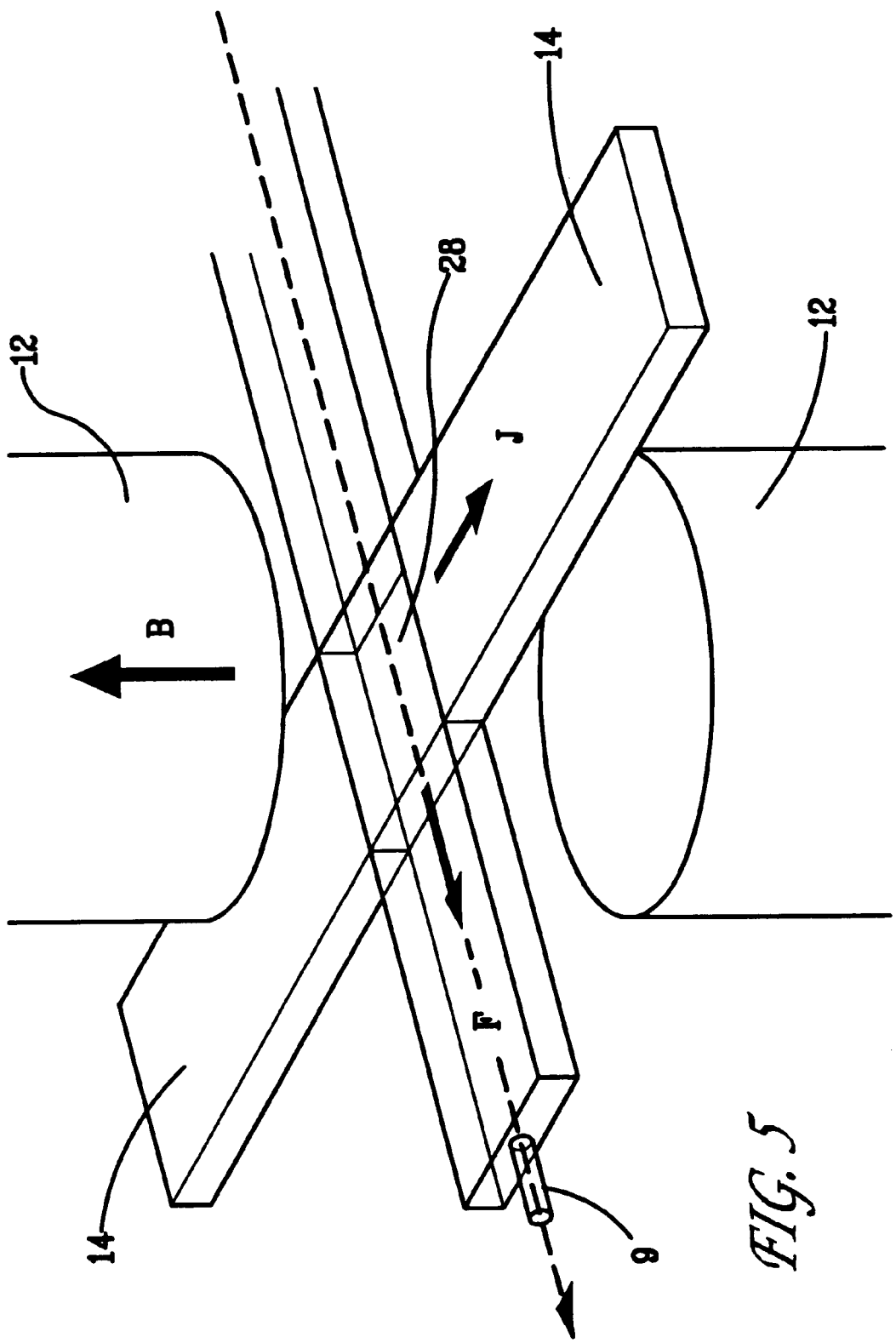
FIG. 5 is a schematic diagram of the principles of operation of the MHD jetting device of the present invention.

A schematic diagram of the principles of operation of the MHD drive chamber and jetting orifice is shown in FIG. 5. An electric current is passed between two electrodes 14 on either side of the drive duct 28 through the conductive liquid metal in the chamber. A magnetic field B is passed through the drive duct 28 at right angles to the electric current flux vector J. This generates a Lorentz force F on the liquid in the drive duct 28 in the direction orthogonal to the magnetic field and current flux vectors according to the right-hand rule. For the rectangular drive chamber geometry shown in FIG. 5, the pressure difference (ΔP) generated along the length of the drive volume is:

$$\Delta P = I * B \div d \quad \text{[Equation 1]}$$

where I is the total current passing through the drive chamber, B is the magnetic field strength, and d is the thickness of the drive chamber in the direction parallel to the magnetic field vector (i.e. the drive chamber field gap). The pressure difference generated in the drive duct 28 is applied directly to the back of the jetter orifice 9 to drive liquid metal out of the orifice 9. The magnitude of the pressure, which is due to the Lorentz force, is directly proportional to the magnitude of the current and the magnetic field, and inversely proportional to the field gap. However, viscous losses in the field gap will increase as $1/d^3$, which limits the extent to which d can be effectively decreased to increase $\Delta P$.

Figure 3B:
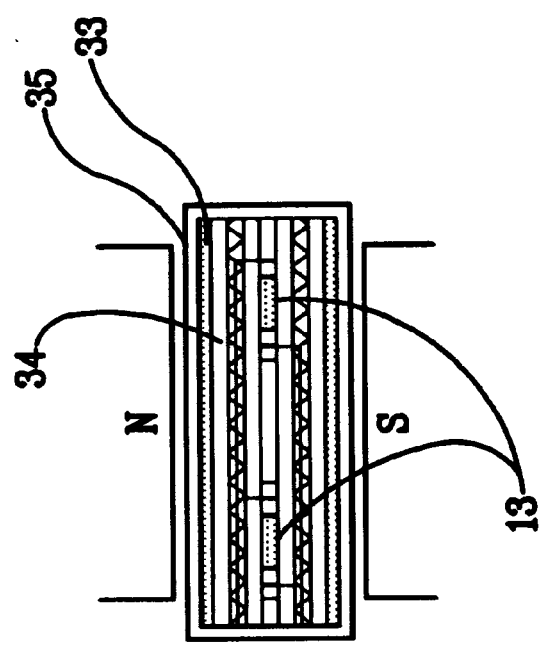
FIG. 3 is a top and end view of the mixing chamber present in the LMJD of the preferred embodiment of the present invention.
Figure 3A:
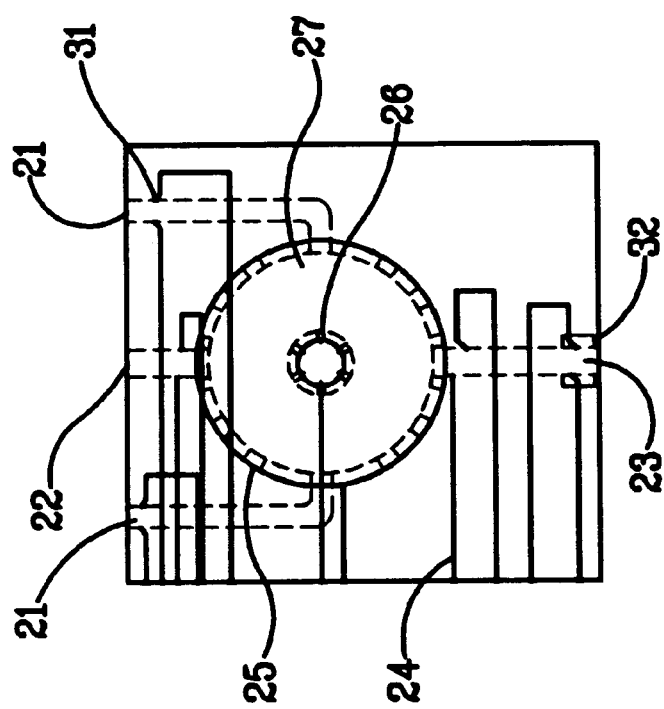

The mixing chamber 3 is detailed in FIG. 3. In the preferred embodiment, the chamber 3 has two feed stream inputs 21 of molten metal. For single component materials the mixer is not needed, while compositions made of three or more individual feed streams may be accommodated by a straightforward extension of the mixing device to include more inlet ports 21 from the additional molten metal reservoirs. One outlet port 23 leads to the drive chamber 4, the other outlet port 22 leads to an optional disposal reservoir. Each inlet port 21 and outlet port 22, 23 is a rectangular duct, with the long dimension oriented normal to the magnetic field produced by the magnet 12 and the short dimension of the port electrodes 31. To carry electric current to the electrodes 25 there are metal leads 24 that are electrically isolated from the molten metal by a layer of inert electric insulator. The mixing chamber 3 also contains a unique rotary electrode arrangement with a central disk electrode 26 and several electrodes 25 of opposite polarity located on the circumference of the annular chamber 27. In normal operation, molten metal is pumped into the mixing chamber 3 from the feedstock reservoirs by applying a controlled current pulse across the electrodes 31 of the inlet ports 21. Then, when the mixing chamber 3 is loaded with the correct ratio of feed metals, a current pulse is applied across the annular region 27, inducing a circumferential flow of the liquid metal and causing it to become well-mixed. Finally, a current is applied across the electrodes 32 leading from the mixing chamber 3 to the drive chamber 4 to move the liquid metal through output 23 to input of the drive chamber 36.

The use of the mixing chamber 3 allows for the composition of a part or a section of a part to be adjusted using a relatively simple process. By controlling the input of the various metal constituents from their reservoirs, which is done by controlling the electrical impulses to the inlet electrodes 31, the composition of the droplets being formed, and thus the portion of the part being manufactured, is assured. Depending on the particular metal mixture desired and the number of inlet ports available, changes in composition can be made without interrupting the formation of the metal part. The ease of this process contrasts sharply with the processes of the prior art, which generally required a full shutdown of the jetting device in order to change the composition being utilized.

Figure 4B:
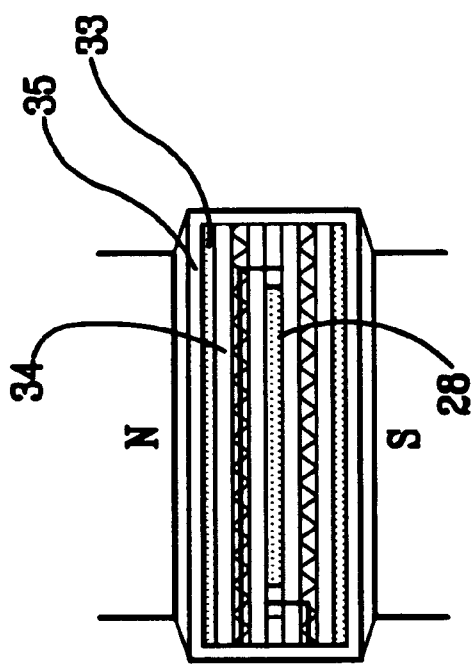
FIG. 4 is a top and end view of the drive chamber present in the LMJD of the preferred embodiment of the present invention.
Figure 4A:
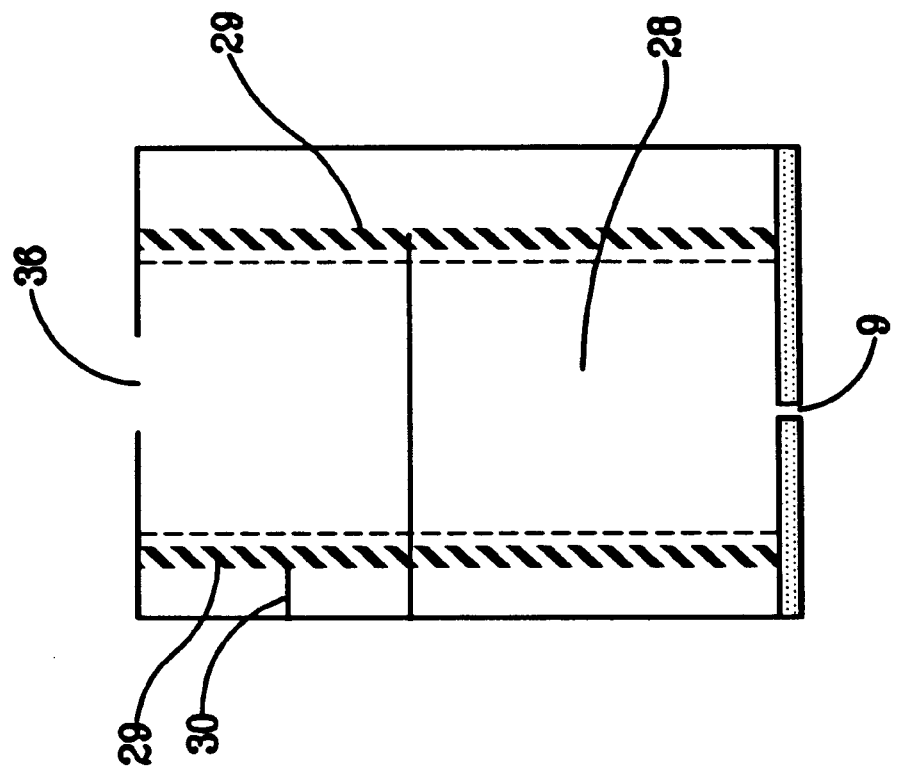

As detailed in FIG. 4, the drive chamber is essentially a rectangular duct 28 with side-mounted electrodes 29 capable of delivering current directly to the molten metal. This current creates enough pressure that a droplet is ejected from the orifice 9 at the end of the drive chamber. The basic principle of operation for the drive chamber is the same as that for the inlet port 21 and the outlet ports 22, 23 of the mixing chamber, except that much greater currents are used here. The drive chamber consists of a rectangular duct 28 with electrodes 29 placed along either side that are used to pass a current through the liquid metal which resides in the chamber. The electrodes are placed on the thin edges of the duct so as to maximize the current density for a given overall current input from the pulse generator 11 that is controlled by the computer 1. Perpendicular to the electric current flux, a magnetic field is imposed that is oriented normal to the broad sections of the rectangular duct 28. In normal operation this field is present at all times. When an electrical current pulse is provided to the electrodes 29 and the chamber contains liquid metal of the desired composition, a Lorentz force is induced in the liquid metal, effectively providing a pressure gradient in the direction of the orifice 9 located at the end of the drive chamber 4. The Lorentz-force induced pressure gradient causes the molten metal to flow from the orifice 9 and create a droplet which, with its momentum, is carried through space towards the metal part 7. The number of molten metal droplets emitted and the time over which they are emitted may be controlled precisely by the wave form of the electric current pulse that is supplied to the electrodes 29. At the same time, the computer 1 causes the stage 6 supporting the target metal part 7 to move and, therefore, to accumulate droplets wherever they are needed.

The metal part 7 is the target at which molten metal droplets are directed from the jetter. As each individual droplet arrives at the part, it impacts and solidifies and adds a small volume of metal to the part 7. As an additive process, this liquid metal jetting technique requires the part 7 to be built up in such a way as to maintain a line-of-sight trajectory between the orifice and the part. This line-of-sight requirement may be satisfied automatically for many parts due to their inherent shape, but can be fulfilled by altering the orientation of the part, altering the orientation of the jetter, or a combination of these processes. For extremely complex topologies it is possible to build metal support structures which are subsequently removed through selective dissolution or melting, for example.

The metal part 7 is built upon a thermal sink 5 that extracts heat from the part, keeping the temperature of the part significantly lower than the solidus and other phase transition temperatures of the material. To some extent, the shape and size of the part and how it is attached to the thermal sink plate 5 will determine how quickly the part 7 can be built. For this reason it is important that the part 7 being built be oriented such that optimal heat transfer occurs between the part 7 and the thermal sink 5.

The thermal sink 5 is optimally mounted upon a multi-axial movable stage 6 that permits the part to be automatically positions to receive incoming droplets at the desired location on the growing workpiece. The stage 6 should be a precision instrument, capable of positioning the part 7 within ½ drop diameter (e.g. about 35 μm) and should be able to move rapidly. A stage 6 that can be programmed to move continuously through specified trajectories would enable the part 7 to be built more quickly.

The jetting device of the present invention must be designed to maintain high metal purity during prolonged operation in the molten state. Many molten metals and alloys are highly corrosive to many materials and are also easily oxidized in the presence of gaseous oxygen. Contamination of the surface of molten metal or in the bulk material is known to have a significant effect on the flow and breakup of molten SnPb solder droplets from small orifices. Clogging of orifices by solid contaminants in molten solder has also been reported despite the use of high purity solders as starting materials. To minimize the molten metal oxidation problem, the jetting device should be operated in an atmospheric chamber continuously purged with ultra high purity helium gas. The oxygen concentration in the effluent from the chamber can be monitored using a zirconia tube oxygen detector or any other method known in the art for following oxygen concentration.

Most molten solder jetting devices previously described in the literature include some type of filter to prevent solid particles in the molten metal from reaching the jetter orifice. These filters have been difficult to implement and function in many cases with only limited success. Upon consideration of all possible sources of solid particle contamination, it is likely that the primary source of this type of contamination is the reaction of the molten metal feedstock with exposed surfaces within the jetting devices to form solid intermetallic crystallites, or reaction of the molten metal with gas phase contaminants to form solid oxides. The lack of a reactive interaction between a substrate and a liquid is often characterized by non-wetting behavior. In the case of SnPb molten alloys, the interaction with alumina is strongly non-wetting. Consequently, the use of nonreactive materials on all wetted surfaces plus the operation of the jetting device under a high purity inert gas atmosphere eliminates the orifice clogging problem without resorting to filters.

Figure 6:
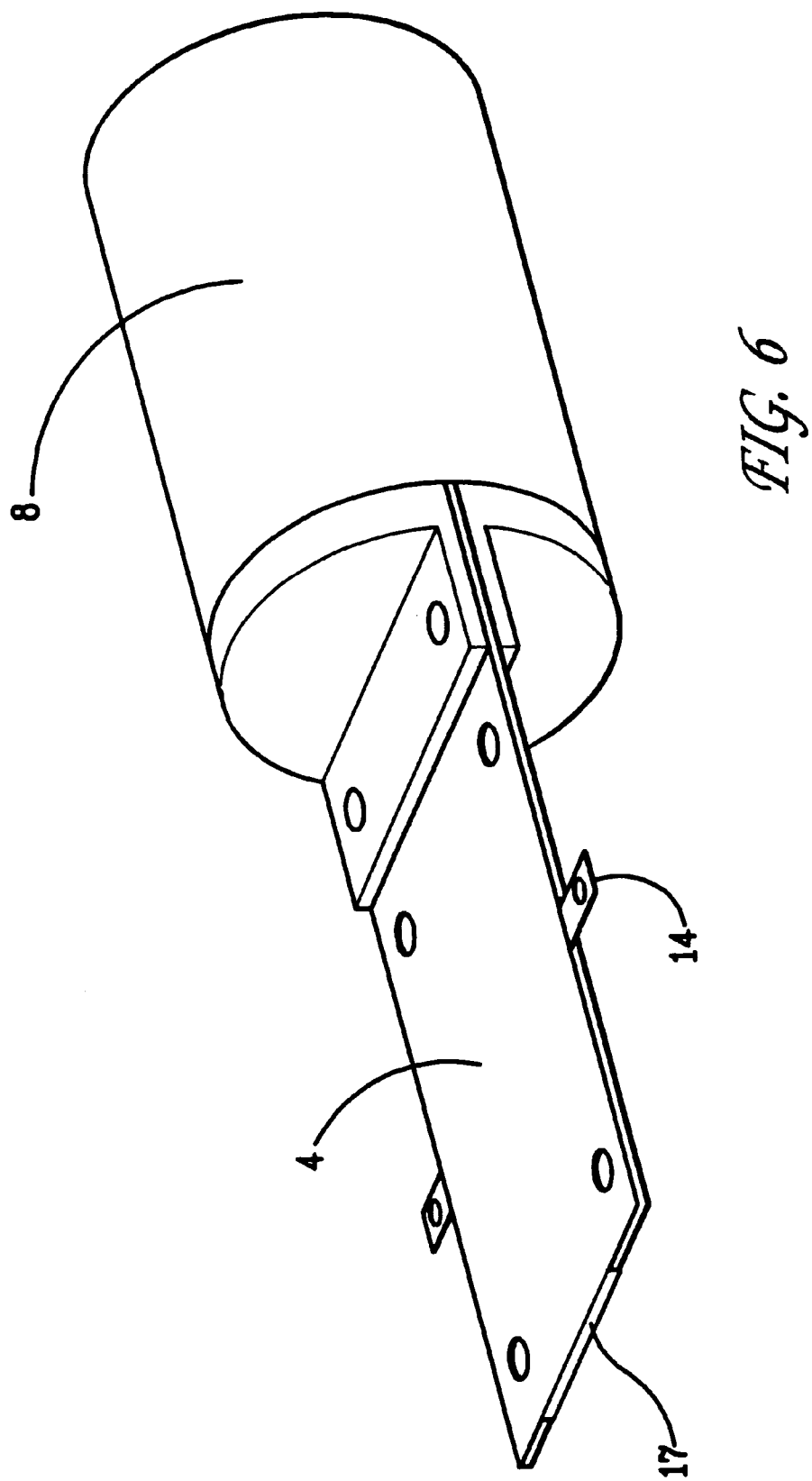
FIG. 6 is a scaled drawing of the ceramic insert assembly of the MHD drive of the present invention.
Figure 7:
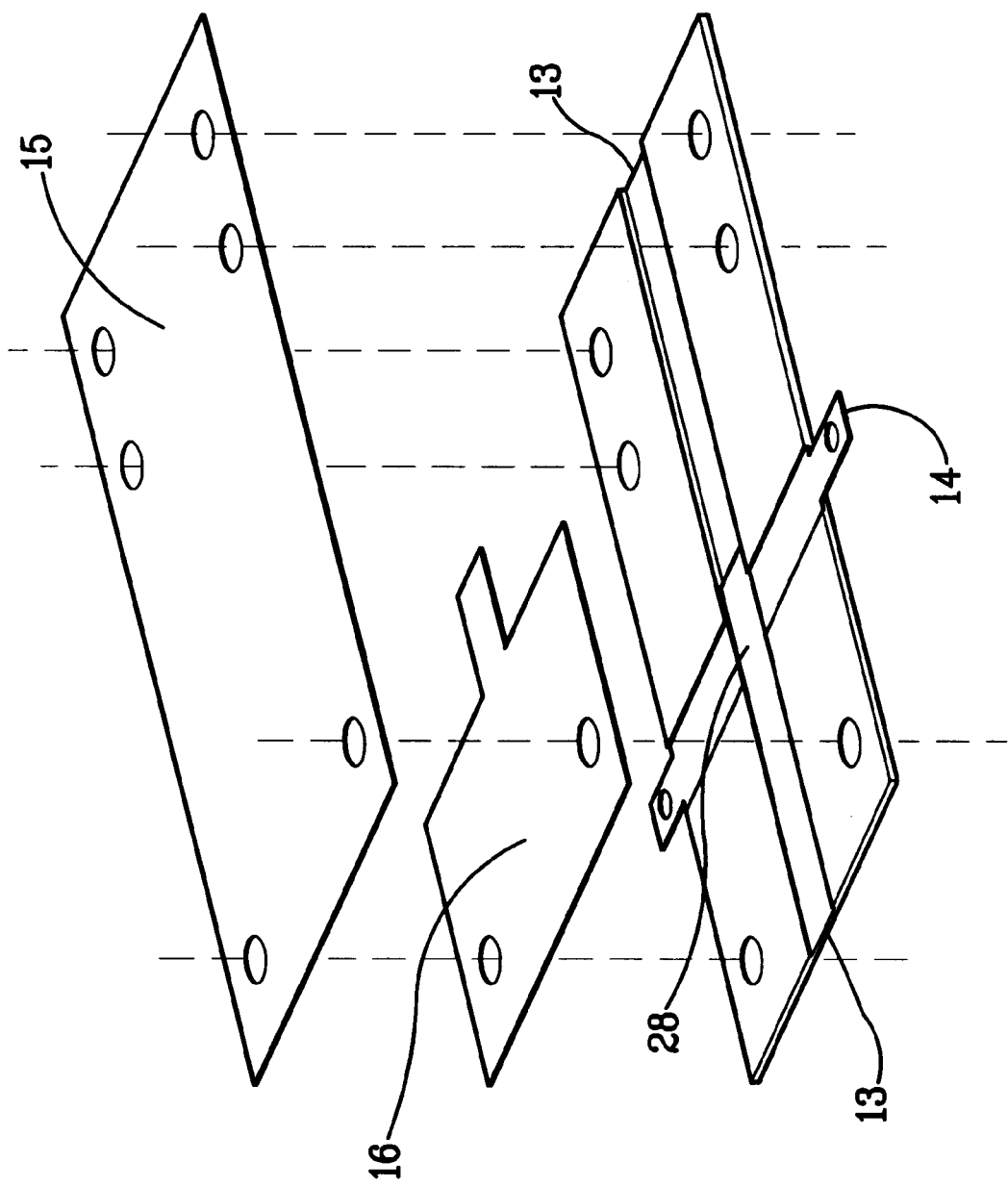
FIG. 7 is an exploded view of the ceramic insert assembly of the MHD drive assembly of the present invention.

A scaled drawing of the parts in contact with the molten metal within the jetting device is shown in FIG. 6. This ceramic insert assembly was designed to be operated in a vertical orientation with the orifice pointed downward at the bottom of the jetter, but other orientations could also be employed. The ceramic insert includes the MHD drive electrodes 14, the liquid metal jetting orifice 9 and the liquid metal reservoir 8. The insert was designed so that it could be removed from the magnet and heater block assemblies, facilitating changes of molten metal type and orifice size in the jetting device. The ceramic insert was fabricated from tantalum, 95% alumina, and Macor parts glued together with Aremco 569 Ceramabond® adhesive. The adhesive is an alumina silicate based material with high temperature chemical properties similar to 95% alumina. An exploded view of the drive assembly in the ceramic insert is shown in FIG. 7. The body of the drive assembly was fabricated from 0.010, 0.015, 0.020, and 0.040 inch thick alumina plates, cut to shape with a $CO_2$ laser. Two plates 15, 16 have been removed from one side of the assembly in the drawing in FIG. 7 to expose the drive chamber 4 and the upper and lower liquid metal channels 13. The upper liquid metal channel leads from the liquid metal reservoir 8 to the drive assembly 4. The electrodes 14 in the drive chamber were fabricated from tantalum foil by electric discharge machining. The electrodes are 1.00 cm wide and are separated by a distance of 1.00 cm. The drive chamber 4 is 600 $\mu$m thick. The lower liquid metal channel 13 in the drive assembly leads from the drive chamber 4 to the jetter orifice 9. Jetter orifice 9 was fabricated by laser drilling a small hole through a 500 $\mu$m thick alumina nozzle plate 17. The length of the jetter orifice 9 is determined by the thickness of the nozzle plate 17. The nozzle plate was glued to the end of the lower liquid metal channel 13 as shown in FIG. 6 using the Ceramabond adhesive. This plate can be separated from the end of drive assembly when necessary using a razor blade.

Figure 8:
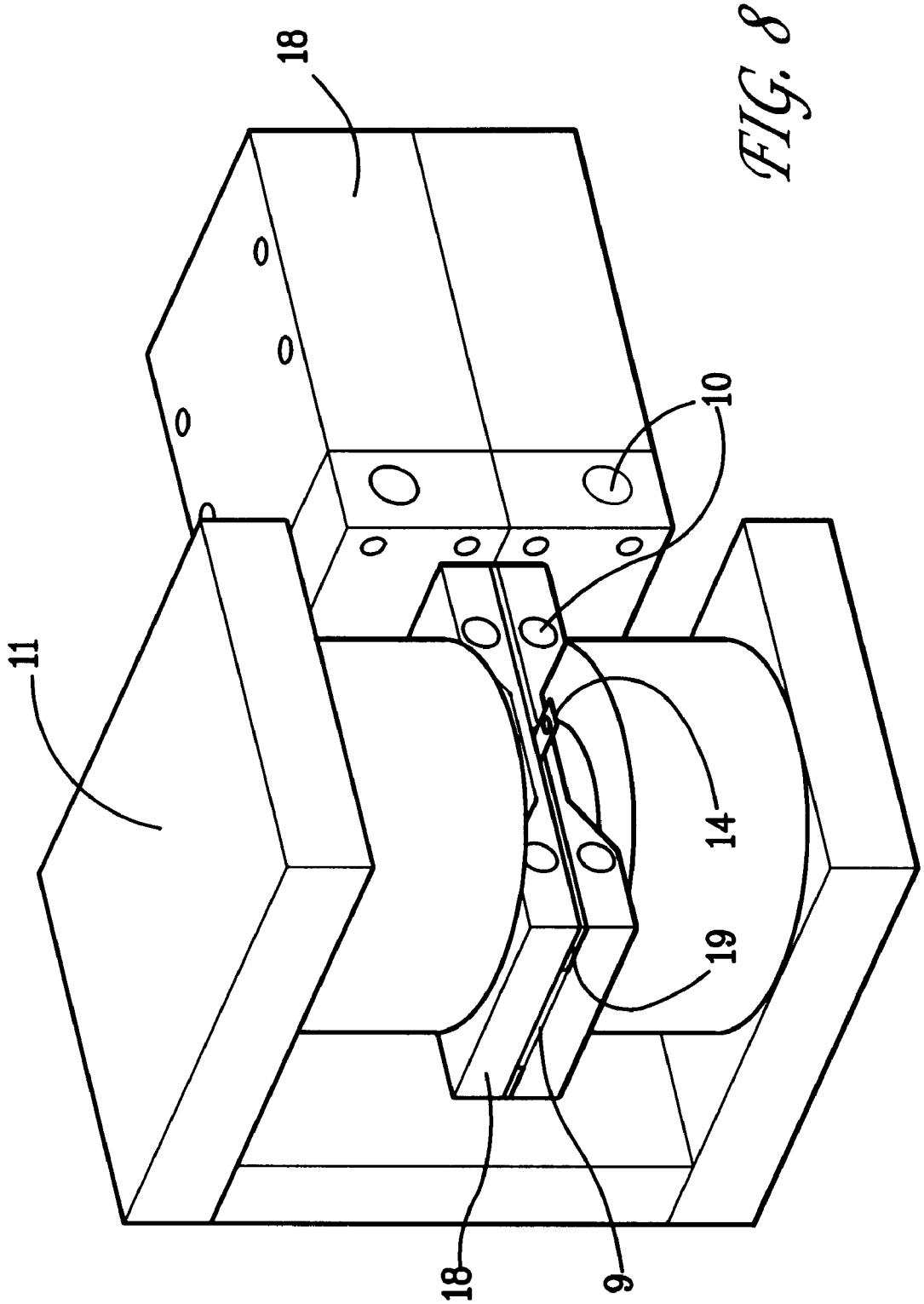
FIG. 8 is a scaled drawing of the complete MHD drive assembly of the present invention.

A scale drawing of the assembled LMJD of the preferred embodiment, without a mixing chamber, is shown in FIG. 8. The ceramic insert 19 is clamped between copper heating blocks 18 to facilitate uniform heating of the ceramic insert. Uniform heating was particularly problematic in the region between the magnetic poles where the cross section for heat conduction to the MHD drive chamber 4 is much smaller than the available surface area for conductive heat loss from this region. The two copper blocks 18 around the drive assembly were heated with four 250 W resistive cartridge heaters 10 located in tight fitting wells on either side of the magnet poles. The four copper blocks 18 surrounding the liquid metal reservoir 8 were heated with six 300 W heaters 10 located in wells in the copper base and side walls of the jetter reservoir. The drive assembly sections above and below the magnetic poles and the liquid metal reservoir were divided into three separate temperature control zones. The temperature in each zone was regulated by a separate closed-loop temperature controller with an independent thermocouple sensor. This temperature control arrangement was necessary to compensate for differences in convective heat loss within the three control regions and resulted in the preferred temperature differential from the liquid metal reservoir 8 to the jetter orifice 9 of less than 3° C.

The magnet 12 used in the jetting device was a permanent magnet fabricated from a samarium-cobalt alloy. The magnet 12 was designed with a pole gap of 1.00 cm and a magnetic field strength of 0.95 tesla. The magnet 12 has a field uniformity of 1% across the 2.54 cm diameter of the magnet poles. The Sm—Co magnet alloy has a Curie temperature of 750° C. which corresponds to a 10% loss of magnetic field strength at an operating temperature of 350° C. relative to room temperature. This alloy is thermally stable up to 250° C. but undergoes a metallurgical change resulting in an irreversible loss of magnetic properties around 500° C. The magnet is expected to lose approximately 10% of its field strength per year of continuous operation at 350° C. The Sm—Co alloy used in magnet 12 is not the most thermally stable magnet alloy available for this application, thus other magnets can be used. Sm—Co magnet alloy was chosen for the present embodiment due to its high magnetic energy density, which was necessary to meet field strength and size constrains in the jetter design.

The current source 11 used to drive the LMJD consists of two bipolar operational amplifier driven, 20 A power transistor banks, connected in parallel. Each op-amp was configured to function as a voltage to current amplifier. The op-amps were driven in parallel by a 16 bit digital-to-analog converter at data rate of 10 $\mu$sec per point under computer control. Current waveforms were measured with a 0.01±1% resistor placed in series with the drive chamber electrodes. The resulting circuit could generate current waveforms of any shape with a maximum amplitude of ±40 A and a maximum transition rate of 1.25 A/$\mu$sec.

The following example is presented to illustrate aspects of the invention, and should not be taken as limiting of the invention in any respect.

EXAMPLE

The jetter design requires at least one insulating and one conductive material. Ninety-five percent alumina ceramic and Macor® machinable ceramic both showed no wetting and no reaction with tin upon heating to 500° C. for 30 minutes. These two materials were used as the primary construction materials for wetted surfaces in the jetting device, although materials showing similar lack of reaction can also be used. Metal alloys containing copper, iron, nickel, chromium, and aluminum were all found to react and form intermetallic compounds with molten tin. Stainless steel (304L) was found to be unreactive to tin at 500° C. as long as the native air-formed oxide was present on the surface of the metal. However, when the air-formed oxide was removed, significant reaction was observed. Because thin oxide films can be easily damaged by mechanical or electrochemical means, we chose not to use these films as primary reaction barriers in the jetter design. Tungsten and tantalum were the only metals found to be unreactive with molten tin in this study. Tantalum was chosen over tungsten as the electrode material for the liquid metal jetter due to its superior machinability and ductility, but the use of tungsten is encompassed by the present invention.

Although certain preferred embodiments have been shown and described, it should be understood that many changes and modifications can be made without departing from the scope of the present invention. All patents and publications referred to within the present specification are hereby incorporated by reference.

What is claimed is:

1. An apparatus for the direct formation of metal parts from molten metal, comprising:
   a) means for supplying said molten metal;
   b) means for heating said molten metal such that it remains fluid while within said apparatus;
   c) means for applying a magnetic field in a direction perpendicular to said means for supplying said molten metal;
   d) means for transmitting electric current directly through said molten metal to exert a force in a first direction on said molten metal, where said means for transmitting can reverse the direction of said current to a second direction, opposite of said first direction, to form a droplet of said molten metal;
   e) receiving means for said droplet where the accumulation of a multitude of said droplets upon said receiving means results in the formation of the desired metal part.

2. The apparatus of claim 1 wherein said means for supplying is a mixing chamber comprising at least two feed stream inputs having port electrodes, where said inputs are oriented normal to the applied magnetic field, an optional disposal reservoir, a rotary electrode arrangement within the annular chamber of said mixing chamber, and a feed stream output having port electrodes, where said output is oriented normal to the applied magnetic field.

3. The apparatus of claim 2 wherein said rotary electrode arrangement comprises two sets of electrodes having opposite polarity, where each set comprises at least one electrode, where one set of electrodes is attached to the interior wall of the annular chamber and the other set of electrodes is attached to the outer wall of the annular chamber, where the passing of current through said two sets of electrodes causes molten metal present in said annular chamber to move, thus mixing said metal.

4. The apparatus of claim 2 which comprises a first and second feed stream input, each feed stream being of a different composition, and each input with port electrodes, where the supply of electric current to said port electrodes is separably controlled, such that variation in the amount of current supplied to each port electrode results in variation in the amount of molten metal that is moved through said first and second input into the annular chamber, and said variation in amount of molten metal moved through said first and second input results in variation of the composition of the droplet produced which, in turn results in variation in the composition of the metal within said desired metal part.

5. The apparatus of claim 1 wherein said means for transmitting comprises:
   a) a programmable electric current source capable of outputting alternating electric current of a predetermined duration; and
   b) a drive chamber comprising an electrode means, in contact with said molten metal, for passing said electric current through said molten metal.

6. The apparatus of claim 1 wherein all parts in contact with said molten metal are made from or coated with materials which do not react with molten tin at a temperature of about 500° C.

7. The apparatus of claim 1 wherein said means for heating are copper heating blocks, wherein the heat supplied by said blocks to the molten metal is regulated by a temperature controller.

8. The apparatus of claim 7 wherein said temperature controller insures that the temperature differential of the molten metal from the molten metal reservoir to the jetter orifice is no greater than about 3° C.

9. The apparatus of claim 1 wherein said means for applying a magnetic force is a samarium-cobalt permanent magnet.

10. The apparatus of claim 1 wherein said receiving means is a thermal sink mounted on a multi-axial movable stage.

11. The apparatus of claim 10 wherein said multi-axial movable stage has a movement precision of about 35 µm.

* * * * *

UNITED STATES PATENT AND TRADEMARK OFFICE
CERTIFICATE OF CORRECTION

PATENT NO. : 6,202,734 B1
DATED : March 20, 2001
INVENTOR(S) : Philip A. Sackinger et al.

It is certified that error appears in the above-identified patent and that said Letters Patent is hereby corrected as shown below:

<u>Column 1,</u>
Line 5, insert the following:
-- The U.S. Government has rights in this invention pusuant to Contract No. DE-AC04-94AL85000 between Sandia Corporation and the Department of Energy. --

Signed and Sealed this

Eleventh Day of December, 2001

*Attest:*

NICHOLAS P. GODICI
*Attesting Officer*     *Acting Director of the United States Patent and Trademark Office*